United States Patent Office 3,012,029
Patented Dec. 5, 1961

3,012,029
3,6-DIOXYGENATED 17α-(2-CARBOXYETHYL)-
ANDROSTANE-5α,17β-DIOL LACTONES
Roy H. Bible, Jr., Morton Grove, Ill., assignor to G. D.
Searle & Co., Chicago, Ill., a corporation of Delaware
No Drawing. Filed May 5, 1960, Ser. No. 26,941
9 Claims. (Cl. 260—239.57)

This invention relates to 3,5,6-trioxygenated 17α-(2-carboxyethyl)androstan-17β-ol lactones and processes for the manufacture thereof. More particularly, this invention relates to chemical compounds of the formula

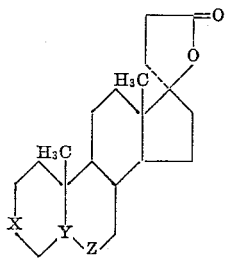

wherein X represents a carbonyl, hydroxymethylene, or alkanoyloxymethylene radical; Y represents a hydroxymethylidyne or alkoxymethylidyne radical; and Z represents a carbonyl, hydroxymethylene, alkanoyloxymethylene, or alkoxymethylene radical.

Among the alkanoyloxymethylene radicals represented by X and Z, those radicals wherein the alkanoyl constituents are of lower order—i.e., (lower alkanoyl)oxymethylene radicals—are preferred. Such radicals are comprehended by the formula

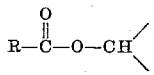

in which R represents an alkyl radical containing fewer than 9 carbon atoms, to wit, methyl, ethyl, propyl, isopropyl, butyl, isobutyl, sec-butyl, tert-butyl, pentyl, isopentyl, tert-pentyl, neopentyl, hexyl, isohexyl, heptyl, octyl, and isomeric $C_nH_{2n+1}$ groupings.

The alkoxymethylidyne radicals represented by Y and the alkoxymethylene radicals represented by Z likewise are preferably of lower order, such radicals being comprehended by the formulas

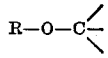

and

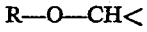

respectively, R in the latter two formulas having the meaning previously assigned.

Optimally, the foregoing radicals are so disposed in the steroid nucleus of the subject lactones that the hydroxy and alkanoyloxy groupings within the ambit of X, and the hydroxy, alkanoyloxy, and alkoxy groupings embraced by Z, are in the β configuration, whereas the hydroxy and alkoxy groupings called for by Y are α-oriented. However, other stereochemical arrangements of these groupings are of course contemplated.

Equivalent to the described lactones for purposes of the present invention are corresponding hydroxy acids and their alkali salts, of the formula

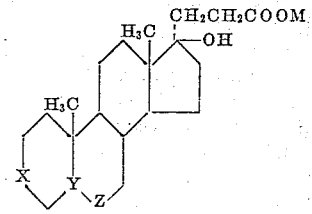

wherein X, Y, and Z have the same meanings as above and M represents hydrogen, an alkali metal, or the ammonium radical. Those skilled in the art will appreciate that the described salts readily derive from the apposite lactones on contact with aqueous alkali. The free acids, in turn, are obtained from the salts by a critically brief exposure to a proton source; prolongation of the exposure time induces lactonization.

The compounds to which this invention relates are useful because of their valuable pharmacological properties. For example, they are potent diuretics, being adapted to block the effect of desoxycorticosterone acetate on urinary sodium and potassium.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

Example 1

17α-(2-carboxyethyl)androstane-3β,5α,6β,17β-tetraol γ-lactone.—To a solution of 50 parts of 17α-(2-carboxyethyl)-5α,6α-epoxyandrostane-3β,17β-diol γ-lactone (U.S. 2,946,787) in 360 parts of acetone is added a solution of 46 parts of concentrated sulfuric acid in 100 parts of water. The resultant mixture is allowed to remain overnight at room temperatures, then diluted with water to precipitate a paste which solidifies on standing. The solid material is filtered off and recrystallized from aqueous methanol to give the desired 17α-(2-carboxyethyl)-androstane-3β,5α,6β,17β-tetraol γ-lactone melting at 255–263.5°, and further characterized by a specific rotation of —43°. The product has the formula

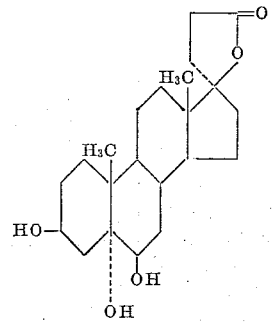

Example 2

17α - (2-carboxyethyl) - 3β,5α,17β - trihydroxyandrostan-6-one γ-lactone.—A mixture of 40 parts of 17α-(2-carboxyethyl)androstane - 3β,5α,6β,17β - tetraol γ - lactone dissolved in 1350 parts of benzene with 17 parts of chromic acid dissolved in 298 parts of acetic acid and 186 parts of water is agitated during 4 hours at room temperatures. The mixture is then partitioned between water and benzene.

The aqueous phase, combined with washings from work-up of the benzene phase as described in Example 3 hereinafter and allowed to stand, affords a crystalline precipitate of 17α - (2 - carboxyethyl) - 3β,5α,17β - trihydroxyandrostan-6-one γ-lactone which, washed with water and thereupon recrystallized from methanol, is obtained as the monomethanolate. This material loses solvent at about 165°, melts at 282–284°, and displays a specific rotation of —78°. It can be completely desolvated by heating at around 200° in vacuo for approximately 4 hours. The resultant 17α-(2-carboxyethyl)-3β,5α,17β-trihydroxyandrostan-6-one γ-lactone is characterized by a specific rotation of —82°. It has the formula

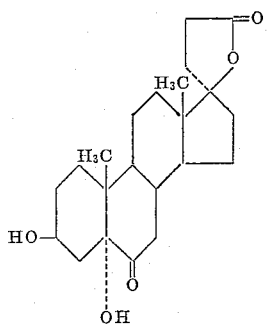

Example 3

17α-(2-carboxyethyl)-5α,17β-dihydroxyandrostane-3,6-dione γ-lactone.—The benzene phase from the partitioning described in Example 2, successively washed with aqueous 5% sodium carbonate and water, affords, on standing, a crystalline precipitate which, recrystallized from a mixture of acetone and hexane, melts at 245° (with decomposition). This material is 17α-(2-carboxyethyl)-5α,17β-dihydroxyandrostane-3,6-dione γ-lactone, of the formula

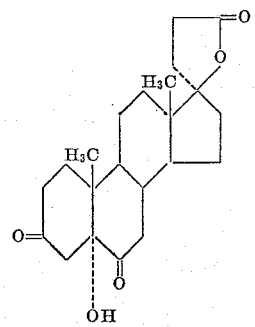

An alternative procedure for the manufacture of this product consists in slowly adding a solution of approximately 17 parts of chromic acid in a mixture of 45 parts of water and approximately 25 parts of concentrated sulfuric acid to a solution of 40 parts of 17α(2-carboxyethyl)androstane-3β,5α,6β,17β-tetraol γ-lactone in 1600 parts of acetone. Excess chromic acid is then decomposed by addition of 2-propanol, whereupon the reaction mixture is diluted with water to throw down the desired 17α - (2 - carboxyethyl)5α,17β - dihydroxyandrostane-3,6-dione γ-lactone as a solid precipitate. The product, collected on a filter and recrystallized from aqueous methanol, manifests a specific rotation of —53°.

Example 4

17α - (2 - carboxyethyl) - 6β - methoxyandrostane-3β,5α,17β - triol γ - lactone.—A solution of 100 parts of 17α - (2 - carboxyethyl) - 5α,6α - epoxyandrostane - 3β,-17β - diol γ - lactone in 400 parts of methanol containing approximately 18 parts of concentrated sulfuric acid is allowed to stand at room temperatures overnight, then diluted with 7 volumes of water. The crystalline material which precipitates on standing is collected on a filter, washed with water, and finally recrystallized from aqueous methanol. It melts at 176.5–179.5°, has a specific rotation of —66°, and is 17α-(2-carboxyethyl)-6β-methoxyandrostane-3β,5α,17β-triol γ-lactone, of the formula

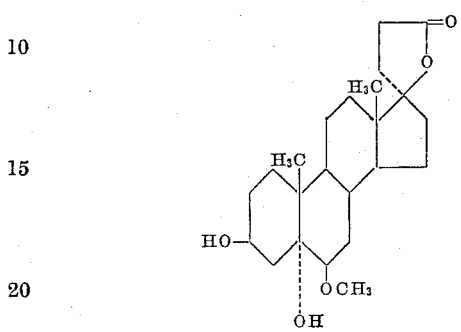

Example 5

17α - (2 - carboxyethyl) - 5α,17β - dihydroxy - 6β-methoxyandrostan - 3 - one γ - lactone.—To a solution of approximately 20 parts of 17α-(2-carboxyethyl)-6β-methoxyandrostane-3β,5α,17β-triol γ-lactone in 800 parts of acetone is slowly added a solution of 6 parts of chromic acid in a mixture of approximately 16 parts of water and 9 parts of concentrated sulfuric acid. When the addition is complete, sufficient 2-propanol is introduced to destroy excess chromic acid, whereupon the resultant mixture is diluted with approximately 20 volumes of water. The crystalline solid which precipitates is collected on a filter and recrystallized from aqueous methanol. The material thus obtained is 17α-(2 - carboxyethyl) - 5α,17β - dihydroxy - 6β - methoxyandrostan - 3 - one γ - lactone, melting at approximately 252° (with decomposition) and having a specific rotation of —37°. The product has the formula

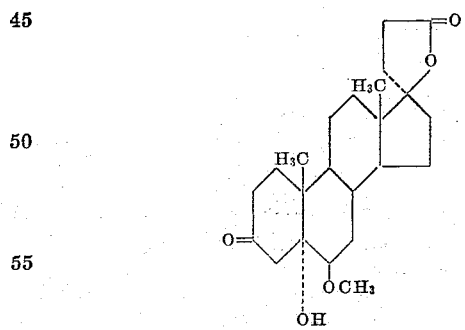

Example 6

3β - acetoxy - 17α - (2-carboxyethyl)-6β-methoxyandrostane-5α,17β-diol γ-lactone.—A solution of 1 part of 17α-(2-carboxyethyl) - 6β - methoxyandrostane - 3β,5α, 17β-triol γ-lactone and 1 part of acetic anhydride in 10 parts of pyridine is let stand at room temperatures overnight, then diluted with 20 volumes of water. The resultant mixture is extracted with ether. The ether extract is washed with water and then freed of solvent by distillation, whereupon the residue is dried azeotropically by the distillation of benzene therefrom. The material thus obtained, recrystallized from a mixture of acetone and hexane, melts at approximately 132°, resolidifies above this temperature, and melts again at approximately 177°. This material is 3β-acetoxy-17α-(2- carboxyethyl)-6β-methoxyandrostane - 5α,17β-diol γ-lactone, of the formula

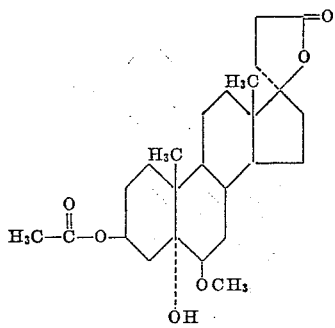

Example 7

*3β,6β-diacetoxy - 17β - (2 - carboxyethyl) androstane-5α,17β-diol γ-lactone.*—A solution of 1 part of 17α-(2-carboxyethyl)androstane-3β,5α,6β,17β - tetraol γ-lactone in a mixture of 1 part of acetic anhydride and 10 parts of pyridine is allowed to stand at room temperatures for 24 hours. The resultant material is partitioned beween water and ether. Evaporation of solvent from the ether phase affords 3β,6β - diacetoxy - 17α-(2-carboxyethyl)androstane-5α,17β-diol γ-lactone as the residue. The product has the formula

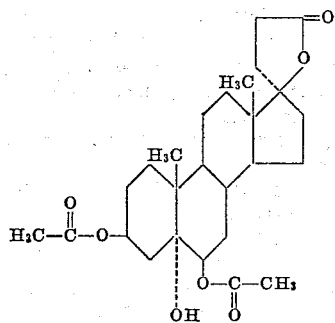

Example 8

*17α - (2 - carboxyethyl) - 3β,6β - dipropionyloxyandrostane-5α,17β-diol γ-lactone.*—Substitution of 1 part of propionic anhydride for the acetic anhydride called for in Example 7 affords, by the procedure there detailed, 17α - (2 - carboxyethyl) - 3β,6β - dipropionyloxyandrostane-5α,17β-diol γ-lactone of the formula

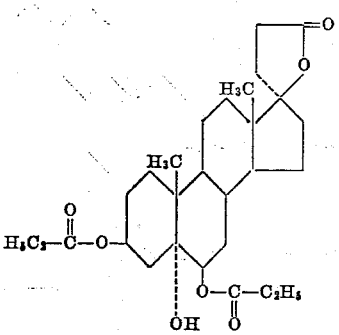

Example 9

*6β - acetoxy - 17α - (2 - carboxyethyl)androstane-3β,5α,17β-triol γ-lactone.*—To a solution of 1 part of 3β,6β-diacetoxy-17α - (2-carboxyethyl)androstane-5α,17β-diol γ-lactone in approximately 30 parts of methanol is added 4 parts of aqueous 10% sodium hydroxide. The resulting mixture is allowed to stand at room temperatures for 2½ hours, then diluted with 18 volumes of water, and finally acidified with 5% hydrochloric acid. The product which precipitates is the desired 6β-acetoxy-17α-(2 - carboxyethyl)androstane - 3β,5α,17β-triol γ-lactone, the formula of which is

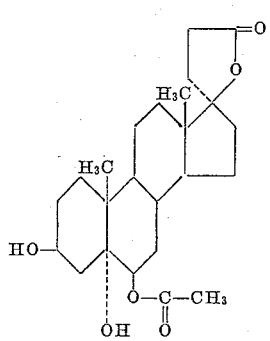

Example 10

*6β - acetoxy - 17α - (2 - carboxyethyl) - 5α,17β - dihydroxyandrostan - 3 - one γ-lactone.*—Substitution of approximately 45 parts of 6β-acetoxy-17α-(2-carboxyethyl)androstane - 3β,5α,17β - triol γ-lactone for the 17α-(2-carboxyethyl)androstane-3β,5α,6β,17β - tetraol γ-lactone called for in Example 3 (second paragraph) affords, by the procedure there detailed, 6β-acetoxy-17α-(2-carboxyethyl)-5α,17β-dihydroxyandrostan-3-one γ-lactone, of the formula

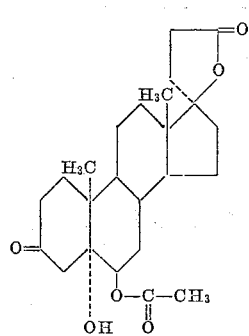

Example 11

*3β-acetoxy-17α-(2-carboxyethyl)androstane - 5α,6β,17β-triol γ-lactone.*—A solution of 38 parts of 17α-(2-carboxyethyl)androstane-3β,5α,6β,17β-tetraol γ-lactone and 10 parts of acetic anhydride in 250 parts of pyridine is allowed to stand at room temperatures overnight. Dilution of the resultant mixture with 25 volumes of water precipitates the desired 3β-acetoxy-17α-(2-carboxyethyl)-androstane-5α,6β,17β-triol γ-lactone. The product has the formula

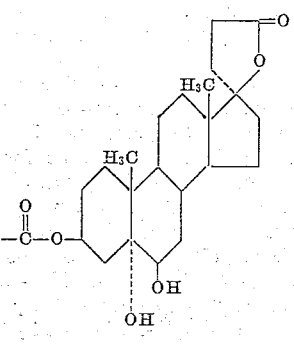

Example 12

*17α-(2-carboxyethyl) - 3β - propionyloxyandrostane-5α, 6β,17β-triol γ-lactone.*—Substitution of 13 parts of propionic anhydride for the acetic anhydride called for in Example 11 affords, by the procedure there detailed, 17α-

(2-carboxyethyl)-3β-propionyloxyandrostane - 5α,6β,17β-triol γ-lactone, of the formula

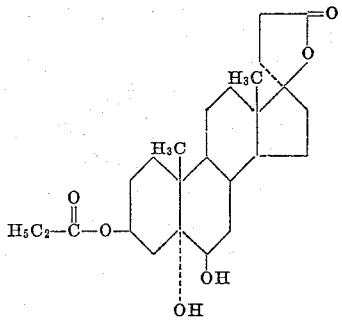

Example 13

*3β-acetoxy - 17α-(2-carboxyethyl)-5α,17β-dihydroxyandrostan-6-one γ-lactone.*—Substitution of 45 parts of 3β-acetoxy-17α-(2-carboxyethyl)androstane - 5α,6β,17β-triol γ-lactone for the 17α-(2-carboxyethyl)androstane-3β,5α,6β,17β-tetraol γ-lactone called for in Example 3 (second paragraph) affords, by the procedure there detailed, 3β-acetoxy-17α-(2-carboxyethyl) - 5α,17β - dihydroxyandrostan-6-one γ-lactone, of the formula

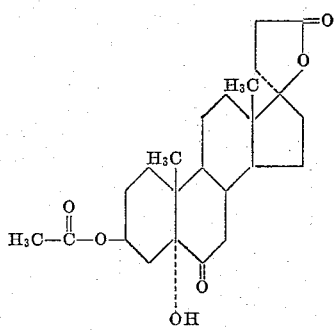

Example 14

A. *6β-benzyloxy - 17α-(2-carboxyethyl)androstane-3β,5α,17β-triol γ-lactone.*—A mixture of 20 parts of 17α-(2-carboxyethyl)-5α,6α - epoxyandrostane-3β,17β-diol γ-lactone, 40 parts of benzyl alcohol, 1 part of concentrated sulfuric acid, and 320 parts of acetone is allowed to stand at room temperatures for 2 days. The reaction mixture is then partitioned between water and ether. The ether phase, upon evaporation of solvent, affords 6β-benzyloxy-17α-(2-carboxyethyl)androstane-3β,5α,17β-triol γ-lactone as the residue.

B. *6β-benzyloxy - 17α-(2 - carboxyethyl)-5α,17β-dihydroxyandrostan-3-one γ-lactone.*—Substitution of approximately 60 parts of 6β-benzyloxy-17α-(2-carboxyethyl)-androstane-3β,5α,17β-triol γ-lactone for the 17α-(2-carboxyethyl)androstane - 3β,5α,6β,17β - tetraol γ-lactone called for in Example 3 (second paragraph) affords, by the procedure there detailed, 6β-benzyloxy-17α-(2-carboxyethyl)-5α,17β-dihydroxyandrostan-3-one γ-lactone.

C. *17α-(2-carboxyethyl)-5α,6β,17β - trihydroxyandrostan-3-one γ-lactone.*—A solution of 4 parts of 6β-benzyloxy-17α-(2-carboxyethyl)-5α,17β - dihydroxyandrostan-3-one γ-lactone in 80 parts of 95% ethanol is agitated at room temperatures under approximately 5 atmospheres of hydrogen for 12 hours in the presence of 1 part of 5% palladium-on-charcoal. The resultant mixture is filtered, and the filtrate is stripped of solvent by vacuum distillation. The residue is 17α-(2-carboxyethyl)-5α,6β,17β-trihydroxyandrostan-3-one γ-lactone, of the formula

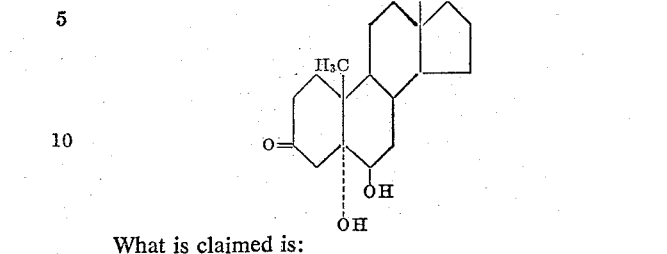

What is claimed is:
1. A compound of the formula

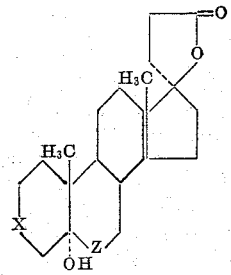

wherein X represents a member of the group consisting of carbonyl, β-hydroxymethylene, and β-[(lower alkanoyl)oxy]methylene radicals; and Z represents a member of the group consisting of carbonyl, β-hydroxymethylene, β-methoxymethylene, and β-[(lower alkanoyl)-oxy]methylene radicals.

2. 17α - (2 - carboxyethyl)androstane - 3β,5α,6β,17β-tetraol γ-lactone.

3. 17α - (2 - carboxyethyl) - 6β - methoxyandrostane-3β,5α,17β-triol γ-lactone.

4. 17α - (2 - carboxyethyl) - 3β,5α,17β - trihydroxyandrostan-6-one γ-lactone.

5. 3β - acetoxy - 17α - (2 - carboxyethyl) - 6β - methoxy-androstane-5α,17β-diol γ-lactone.

6. 17α - (2 - carboxyethyl) - 5α,17β - dihydroxy - 6β-methoxyandrostan-3-one γ-lactone.

7. 17α - (2 - carboxyethyl) - 5α,17β - dihydroxy - androstane-3,6-dione γ-lactone.

8. A compound of the formula

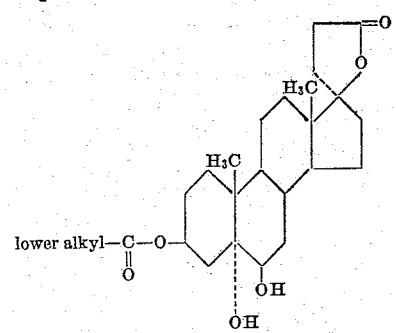

9. A compound of the formula

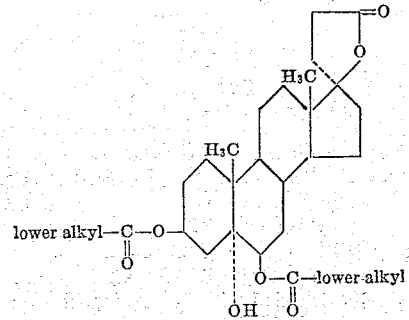

No references cited.